United States Patent [19]

Nakatsugawa

[11] Patent Number: 6,134,236
[45] Date of Patent: Oct. 17, 2000

[54] DATA FORMAT USED IN DATA COMMUNICATION SYSTEM

[75] Inventor: Yoshinori Nakatsugawa, Susono, Japan

[73] Assignee: Yazaki Corporation, Tokyo, Japan

[21] Appl. No.: 09/035,428

[22] Filed: Mar. 5, 1998

[30] Foreign Application Priority Data

Mar. 5, 1997 [JP] Japan .................................. 9-050624

[51] Int. Cl.[7] ...................................................... H04J 3/24
[52] U.S. Cl. ........................ 370/393; 370/404; 370/408; 370/471; 370/475
[58] Field of Search ...................................... 370/389, 392, 370/393, 400, 401, 402, 403, 404, 405, 406, 408, 465, 470, 471, 475, 476

[56] References Cited

U.S. PATENT DOCUMENTS

| 5,081,621 | 1/1992 | Sugimoto . | |
|---|---|---|---|
| 5,586,116 | 12/1996 | Hofestadt et al. | 370/389 |
| 5,684,798 | 11/1997 | Gauthier | 370/395 |
| 5,734,824 | 3/1998 | Choi | 370/401 |
| 5,926,101 | 7/1999 | Dasgupta | 370/408 |

FOREIGN PATENT DOCUMENTS

| 1-160234 | 6/1989 | Japan . |
|---|---|---|
| 7-131866 | 5/1995 | Japan . |
| WO 95/01025 | 1/1995 | WIPO . |

*Primary Examiner*—Ricky Ngo
*Attorney, Agent, or Firm*—Oblon, Spivak, McClelland, Maier & Neustadt, P.C.

[57] ABSTRACT

Routes of communication data are set in an address area provided in communication data as transmission object by use of root addresses, which are constructed by arranging addresses of relay units existing at branch points in the communication routes in passing order. The address area is divided into a majority code describing area, in which majority codes formed by coding at least types of the relay units in a discriminable manner are described, and a type code describing area, in which type codes formed by coding either the relay units of the same type or node terminals as connection objects in a discriminable manner are described.

2 Claims, 3 Drawing Sheets

MAJORITY CODE

| b7 | b6 | b5 | |
|---|---|---|---|
| 1 | 1 | 1 | |
| 1 | 1 | 0 | RH |
| 1 | 0 | 1 | |
| 1 | 0 | 0 | |
| 0 | 1 | 1 | H |
| 0 | 1 | 0 | |
| 0 | 0 | 1 | GW |
| 0 | 0 | 0 | N |

RH : ROOT HUB
H  : HUB
GW : GATE WAY
N  : NODE

MAJORITY CODE

| b7 | b6 | b5 |    |
|----|----|----|----|
| 1  | 1  | 1  |    |
| 1  | 1  | 0  | RH |
| 1  | 0  | 1  |    |
| 1  | 0  | 0  |    |
| 0  | 1  | 1  | H  |
| 0  | 1  | 0  |    |
| 0  | 0  | 1  | GW |
| 0  | 0  | 0  | N  |

RH : ROOT HUB
H  : HUB
GW : GATE WAY
N  : NODE

FIG. 4

ALLOCATION OF TYPE CODES FOR AV/C DEVICE OR SUB-DEVICE (MAJORITY CODE 000)

| TYPE CODE | | | | | TYPE CODES OF AV/C DEVICE OR SUB-DEVICE |
|---|---|---|---|---|---|
| b7 | b6 | b5 | b4 | b3 | |
| 0 | 0 | 0 | 0 | 0 | VIDEO MONITOR |
| 0 | 0 | 0 | 0 | 1 | AUDIO AMPLIFIER |
| 0 | 0 | 0 | 1 | 0 | SWITCH BOX |
| 0 | 0 | 0 | 1 | 1 | RESERVED FOR FUTURE STANDARDIZATION |
| 0 | 0 | 1 | 0 | 0 | VIDEO CASSETTE RECORDER |
| 0 | 0 | 1 | 0 | 1 | TV RECEPTION SYSTEM |
| 0 | 0 | 1 | 1 | 0 | VIDEO DISK PLAYER |
| 0 | 0 | 1 | 1 | 1 | CAMERA |
| 0 | 1 | 0 | 0 | 0 | TELETEXT DECODER |
| 0 | 1 | 0 | 0 | 1 | VIDEOTEX DECODER |
| 0 | 1 | 0 | 1 | 0 | VIDEO PRINTER |
| 0 | 1 | 0 | 1 | 1 | BROADCAST FAX |
| 0 | 1 | 1 | 0 | 0 | VIDEO EFFECTS UNIT |
| 0 | 1 | 1 | 0 | 1 | RESERVED FOR FUTURE STANDARDIZATION |
| 0 | 1 | 1 | 1 | 0 | RESERVED FOR FUTURE STANDARDIZATION |
| 0 | 1 | 1 | 1 | 1 | RESERVED FOR FUTURE STANDARDIZATION |
| 1 | 0 | 0 | 0 | 0 | RADIO TUNER |
| 1 | 0 | 0 | 0 | 1 | AUDIO TAPE RECORDER (CASSETTE RECORDER, DAT) |
| 1 | 0 | 0 | 1 | 0 | AUDIO DISK PLAYER (PHONO, CD) |
| 1 | 0 | 0 | 1 | 1 | RESERVED FOR FUTURE STANDARDIZATION |
| 1 | 0 | 1 | 0 | 0 | AUDIO EFFECTS UNIT |
| 1 | 0 | 1 | 0 | 1 | RESERVED FOR FUTURE STANDARDIZATION |
| 1 | 0 | 1 | 1 | 0 | RESERVED FOR FUTURE STANDARDIZATION |
| 1 | 0 | 1 | 1 | 1 | RESERVED FOR FUTURE STANDARDIZATION |
| 1 | 1 | 0 | 0 | 0 | PERSONAL COMPUTER |
| 1 | 1 | 0 | 0 | 1 | CONTROL FUNCTION FOR AUDIO AND/OR VIDEO |
| 1 | 1 | 0 | 1 | 0 | CD MEMORY (CD-ROM, CD-I) |
| 1 | 1 | 0 | 1 | 1 | RESERVED FOR FUTURE STANDARDIZATION |
| 1 | 1 | 1 | 0 | 0 | TIMER |
| 1 | 1 | 1 | 0 | 1 | RESERVED FOR FUTURE STANDARDIZATION |
| 1 | 1 | 1 | 1 | 0 | RESERVED FOR FUTURE STANDARDIZATION |
| 1 | 1 | 1 | 1 | 1 | RESERVED FOR FUTURE STANDARDIZATION |

DATA FORMAT USED IN DATA COMMUNICATION SYSTEM

BACKGROUND OF THE INVENTION

1. Field of the Invention

The present invention relates to a data communication system which is capable of executing data exchange between plural networks by connecting the plural networks, to which node terminals are connected respectively, via relay units and, more particularly, a data format for use in a communication system in which respective routes of communication data as transmission objects can be arranged by use of root addresses which are constructed by arranging addresses of the relay units existing at branch points of the communication routes in passing order.

2. Description of the Prior Art

In the prior art, as disclosed in Patent Application Publication (KOKAI) 59-62245, for example, a data communication system has been widely known in which a plurality of local area networks (referred to as "LAN's" hereinafter) used to execute data exchange between a plurality of stations are connected via gate ways to enable data exchange between LANs.

According to the technology disclosed in the above Publication, in addition to transmitter/receiver addresses for designating the transmitter and the receiver of data respectively, a transmitting or receiving station address indicating the data transmitting or receiving station and a network address indicating the network to which the data transmitting or receiving station belongs have been provided in the transmitter/receiver addresses of the communication data. Hence, even if data communication is to be carried out beyond its own network, certain data communication between different LAN's has been made possible by referring to these addresses upon data communication.

However, according to the addressing approach in the above data communication system in the prior art, the network address designated as the destination and the network address peculiar to the LAN in which the communication data exist have been compared with each other, and then it has been decided timely, based on whether or not these addresses coincide with each other, whether or not the communication data have reached the LAN as the destination. Therefore, for example, at the time when communication is carried out between the LANs with the intervention of one or more than two LANs in the communication routes, in case the routes branch off to plural routes with the travel of the communication data, the above communication system has not been able to decide which branch routes the communication data should be supplied to, so that the communication data have reached the destination LAN while taking a detour of the route. As a result, such a problem to be solved has been involved in the prior art that it is difficult to increase data transmission capability per unit time.

Moreover, according to the addressing approach in the above communication system in the prior art, at the time when various addresses including the transmitter/receiver addresses, a transmitting or receiving station address, network addresses, etc. are allocated to the communication data, procedures of writing various addresses in the small address area has not been mentioned, so that there has been such a tendency that the address area used to write various addresses is expanded. As a result, the same problem to be solved has also been involved in the prior art that it is difficult from this respect to increase the data transmission capability per unit time.

SUMMARY OF THE INVENTION

The present invention has been made in light of the above circumstances, and it is an object of the present invention to provide a data format for use in a data communication system capable of surely transmitting communication data to a node terminal as a designated destination without a reduction in data transmission capability per unit time, even when data exchange is carried out between networks with the intervention of one or more than two networks in the communication routes and also the routes branch off into plural routes with the travel of the communication data, by setting routes of communication data in an address area provided in communication data as transmission object by use of root addresses, which are constructed by arranging addresses of relay units existing at branch points in the communication routes in passing order, then dividing the address area into a majority code describing area, in which majority codes formed by coding at least types of the relay units in a discriminable manner are described, and a type code describing area, in which type codes formed by coding either the relay units of a same type or node terminals as connection objects in a discriminable manner are described, and then setting bit lengths of the majority code describing area and the type code describing area to appropriate values respectively while taking in account that communication routes are set by use of the root addresses.

In order to achieve the above object of the present invention, there is provided a data format for use in a data communication system constructed by connecting a plurality of networks, to which node terminals are connected respectively, via relay units so as to execute data exchange between the networks, the data format being constructed by setting routes of communication data in an address area provided in communication data as transmission object by use of root addresses, which are constructed by arranging addresses of relay units existing at branch points in the communication routes in passing order, dividing the address area into a majority code describing area, in which majority codes formed by coding at least types of the relay units in a discriminable manner are described, and a type code describing area, in which type codes formed by coding either the relay units of a same type or node terminals as connection objects in a discriminable manner are described, and setting bit lengths of the majority code describing area and the type code describing area to appropriate values respectively while taking in account that communication routes are set by use of the root addresses.

According to the present invention, at first, types of the relay units are identified by use of the majority codes and also the relay units of the same type or the node terminals as the connection object can be identified by use of the type codes. Where bit lengths of the majority code describing area and the type code describing area are set to appropriate values respectively while taking in account that communication routes are set by use of the root addresses. In other words, respective bit lengths of the majority code describing area and the type code describing area are set to appropriate values so as to be accommodated to the data communication system in which the communication routes are set by use of the root addresses. For this reason, even when data exchange is carried out between networks with the intervention of one or more than two networks in the communication routes and also the routes branch off into plural routes with the travel of the communication data, there can be obtained a data format for use in a data communication system which can transmit communication data to a node terminal as a designated destination surely without a reduction in data transmission capability per unit time.

In order to achieve the above object of the present invention, there is provided a data format for use in a data communication system constructed by connecting a plurality of networks, to which node terminals are connected respectively, via relay units so as to execute data exchange between the networks, the data format being constructed by setting routes of communication data in an address area provided in communication data as transmission object by use of root addresses, which are constructed by arranging addresses of relay units including root hubs, hubs, and gate ways and existing at branch points in the communication routes in passing order, dividing the address area into a majority code describing area, in which majority codes formed by coding information of types of the relay units or information of node terminals in a discriminable manner are described, and a type code describing area, in which type codes formed by coding either the relay units of a same type or node terminals as connection objects in a discriminable manner are described, and setting weighting of information amount included in the majority code describing area and the type code describing area in the address area such that a bit length of the majority code describing area can be set small and a bit length of the type code describing area can be set relatively large.

According to the present invention, first of all, information of types of the relay units including the root hubs, the hubs, the gate ways or information of the node terminals can be identified by use of the majority codes, and also the relay units of the same type or the node terminals as the connection object can be identified by use of the type codes. Where respective bit lengths of the majority code describing area and the type code describing area are set to appropriate values with regard that communication routes are set by use of the root addresses. In other words, assuming that the data communication system is constructed by setting the communication routes with the use of the root addresses, the weighting values of information amount included in the majority code describing area and the type code describing area in the address area are set to appropriate values respectively such that the bit length of the majority code describing area is set smaller and the bit length of the type code describing area is set to relatively larger. Therefore, even when data exchange is carried out between networks with the intervention of one or more than two networks in the communication routes and also the routes branch off into plural routes with the travel of the communication data, there can be obtained a data format for use in a data communication system which can surely transmit communication data to a node terminal as a designated destination without a reduction in data transmission capability per unit time.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a table illustrative of an example of allocation of type codes.

DESCRIPTION OF THE PREFERRED EMBODIMENT

A data format for use in a data communication system according to an embodiment of the present invention will be explained in detail with reference to the accompanying drawings hereinafter.

Figure 1:
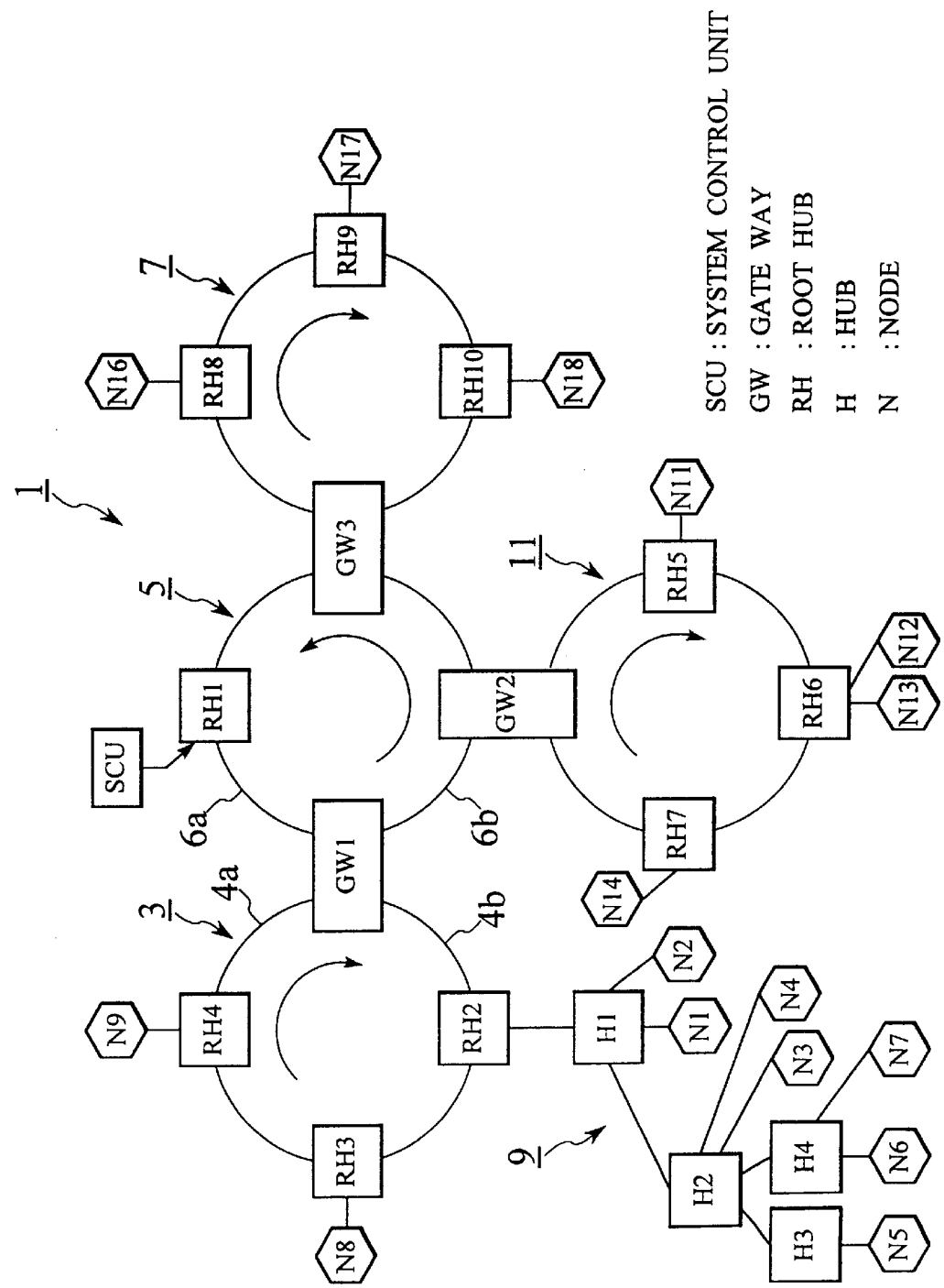
FIG. 1 is a schematic block circuit diagram showing a configuration of a data communication system according to the present invention.

At first, as shown in FIG. 1, a data communication system 1 according to an embodiment of the present invention is constructed by connecting first to fourth LAN's 3, 5, 7, 11 via first to third gate ways GW1, GW2, GW3 mutually data-interchangeably and also by connecting a multi-layered tree 9, which includes a plurality of hubs H, to the root hub RH2 which belongs to the first LAN 3. The first to fourth LAN's 3, 5, 7, 11 are constructed by connecting a plurality of root hubs RH via loop data transmission lines respectively. As a network topology for the first to fourth LAN's 3, 5, 7, 11, for example, bus type, star type, etc., may be employed appropriately in addition to the above loop type.

A system control unit (SCU) which can manage synchronization control, etc. of the overall data communication system 1 is connected to the root hub RH1. One or more than two node terminals N which are positioned as connection destination devices are connected to a plurality of root hubs RH except the root hubs RH1, RH2 or a plurality of hubs H respectively. As shown in FIG. 1, inherent addresses are allocated previously like RH1, RH2, RH3, . . . , for example, to root hubs RH, hubs H, and node terminals N respectively. Out of these addresses, the addresses allocated to the node terminals N respectively are used to designate the node terminals N serving as the destination or the source, and the addresses allocated to the root hubs RH or the hubs H are used to designate routes of the communication data with reference to root address. The root addresses are constructed by arranging addresses of the relay units, which exist at branch points of the communication routes, in passing order. If the communication system according to the present invention is applied to the vehicle communication system, for example, which enables to exchange various data such as digital audio data mutually, various devices such as a vehicle-equipped personal computer, a portable telephone, a DVD (Digital Video Disc, or Digital Versatile Disc)-ROM drive, a digital TV set, a CD (Compact Disc)-ROM drive, a navigation system, a radio receiver, a speaker, etc. may be employed appropriately as the node terminals N.

Further, each of the first to third gate ways GW1, GW2, GW3 has a protocol conversion function and a route selection function respectively. According to such protocol conversion function, a protocol conversion can be executed to accommodate the packet data, which are sent out from the node terminals N belonging to the first to fourth LAN's 3, 5, 7, 11 respectively or the node terminals N belonging to the multi-layered tree 9, to protocol of the neighboring LAN's, and then the converted packet data can be sent out to the neighboring LAN's. According to such route selection function, the root addresses which are allocated to the packet data sent out from any node terminal N are decoded, then appropriate routes as the destination of the packet data based on the decoded root addresses are selected, and then the communication data can be sent out to the selected route.

As shown in FIG. 1, inherent addresses, like GW1, GW2, GW3, for example, are allocated previously to the first to third gate ways GW1, GW2, GW3 respectively. Like the addresses allocated to the root hubs RH, or the hubs H, these addresses are similarly used to designate the route of the communication data in the root addresses.

Next, the data format used in the data communication system 1 constructed as above will be explained with reference to FIGS. 2 to 4.

Figures 2, 3:
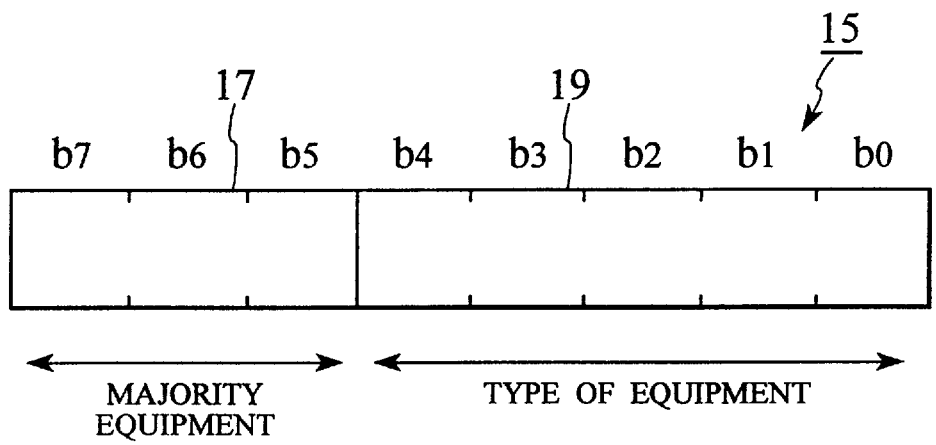
FIG. 2 is a view showing a data format for use in the data communication system according to the present invention.
FIG. 3 is a table illustrative of an example of allocation of majority codes to types of relay units.

As shown in FIG. 2, the data format employed in the data communication system 1 is constructed as follows. That is, an address area 15 is set to have a predetermined bit length in the communication data as the transmission object. The address area 15 is then divided into a majority code describing area (b5, b6, b7) 17 and a type code describing area (b0, b1, b2, b3, b4) 19 such that, taking into account particular circumstances needed to arrange communication routes by use of the root addresses, bit lengths of the majority code describing area 17 and the type code describing area 19 are set to appropriate values respectively. Majority codes which can be prepared by coding either information of types of the relay units including the root hub RH, the hub H, and the gate way GW or information of the node terminal N in an discriminable manner are described in the majority code describing area 17. Type codes which can be prepared by coding the relay units of the same type or types of devices as connection objects in an discriminable manner are described in the type code describing area 19. More particularly, in the example of this embodiment, a bit length of the address area 15 is set to eight bits, a bit length of the majority code describing area 17 is set to three bits, and a bit length of the type code describing area 19 is set to five bits.

As shown in FIG. 3, according to the majority codes of three bits, eight types of relay units, etc. can be identified in full. If one majority code (000) is allocated to the node terminal N, for example, the relay units of different types can be identified by remaining majority codes up to seven types except for this node terminal N. More particularly, in the example of the embodiment, four majority codes (111), (110), (101), (100) are allocated to the root hubs RH, two majority codes (011), (010) are allocated to the hubs H, one majority code (001) is allocated to the gate way GW, and one majority code (000) is allocated to the node terminal N. Information amounts allocated to respective relay units may be modified to arbitrary values other than the above. Meanwhile, as shown in FIG. 4, for example, according to the type code having the five bit length, types of the devices up to thirty-two types can be identified as a whole. Therefore, as the maximum connectable number of the relay units or the node terminals using the data format according to the present embodiment, 128 root hubs RH, 64 hubs H, 32 gate ways GW, and 32 node terminals can be connected respectively.

As described above, respective bit lengths of the majority code describing area 17 and the type code describing area 19 are set to be weighted at a ratio of 3:5. This is due to the facts that routes of the communication data are arranged by the root addresses, which are constructed by arranging the addresses peculiar to the relay units existing at the branch points in the communication routes in passing order, in the data communication system 1 of the present invention and that such data communication system, to which a number of the relay units of the same type, e.g., more than eight of the root hubs RH are connected, is assumed.

In other words, in the data format used in the data communication system according to the present invention, under the assumption that the relay units including the root hubs RH, the hubs H, and the gate ways GW can be handled as one of the devices, at first either information of types of the relay units or information of the node terminal are identified by the majority codes, and then either relay unit addresses peculiar to respective relay units of the same type such as a plurality of root hubs RH, for example, or device addresses peculiar to respective node terminals N are identified by the type code.

In this manner, according to the data format used in the data communication system of the present invention, while suppressing the total bit length allocated to the address area into an appropriate small area such as eight bit area, the weighting of information amount included in the majority code describing area 17 and the type code describing area 19 is set properly in the address area such that the bit length of the majority code describing area 17 can be set smaller and the bit length of the type code describing area 19 can be set larger. As a consequence, the data format can be achieved which is constructed to arrange routes of the communication data by use of the root addresses assumed in the data communication system 1 of the present invention and also to accommodate the data communication system in which a plurality of the relay units of the same type, i.e., more than eight of the relay units, are connected. In other words, even when data exchange is carried out between networks with the intervention of one or more than two networks in the communication routes and also the routes branch off into plural routes with the travel of the communication data, there can be obtained a data format for use in a data communication system which can surely transmit communication data to a node terminal as a designated destination without a reduction in data transmission capability per unit time.

It should be understood that many modifications and adaptations of the invention will become apparent to those skilled in the art and it is intended to encompass such obvious modifications and changes in the scope of the claims appended hereto.

What is claimed is:

1. A data format for use in a data communication system constructed by connecting a plurality of networks, to which node terminals are connected respectively, via relay units so as to execute data exchange between the networks, the data format being constructed by setting routes of communication data in an address area provided in communication data as transmission object by use of root addresses, which are constructed by arranging addresses of relay units existing at branch points in the communication routes in passing order, dividing the address area into a majority code describing area, in which majority codes formed by coding at least types of the relay units in a discriminable manner are described, and a type code describing area, in which type codes formed by coding either the relay units of a same type or node terminals as connection objects in a discriminable manner are described, and setting bit lengths of the majority code describing area and the type code describing area to appropriate values respectively while taking in account that communication routes are set by use of the root addresses.

2. A data format for use in a data communication system constructed by connecting a plurality of networks, to which node terminals are connected respectively, via relay units so as to execute data exchange between the networks, the data format being constructed by setting routes of communication data in an address area provided in communication data as transmission object by use of root addresses, which are constructed by arranging addresses of relay units including root hubs, hubs, and gate ways and existing at branch points in the communication routes in passing order, dividing the address area into a majority code describing area, in which majority codes formed by coding information of types of the relay units or information of node terminals in a discriminable manner are described, and a type code describing area, in which type codes formed by coding either the relay units of a same type or node terminals as connection objects in a discriminable manner are described, and setting weighting of information amount included in the majority code describing area and the type code describing area in the address area such that a bit length of the majority code describing area can be set small and a bit length of the type code describing area can be set relatively large.

* * * * *